US011317628B2

(12) United States Patent
Noller et al.

(10) Patent No.: US 11,317,628 B2
(45) Date of Patent: May 3, 2022

(54) MICROPARTICLE COMPOSITIONS COMPRISING SAFLUFENACIL

(71) Applicant: BASF Agro B.V., Arnhem (NL)

(72) Inventors: Bastian Marten Noller, Neuhofen (DE); Yannick Fuchs, Speyer (DE); Anja Simon, Weinheim (DE); Christian Sowa, Neustadt (DE)

(73) Assignee: BASF AGRO B.V., Arnhem (NL)

( * ) Notice: Subject to any disclaimer, the term of this patent is extended or adjusted under 35 U.S.C. 154(b) by 42 days.

(21) Appl. No.: 15/756,353

(22) PCT Filed: Sep. 2, 2016

(86) PCT No.: PCT/EP2016/070676
§ 371 (c)(1),
(2) Date: Feb. 28, 2018

(87) PCT Pub. No.: WO2017/037210
PCT Pub. Date: Mar. 9, 2017

(65) Prior Publication Data
US 2018/0249712 A1 Sep. 6, 2018

(30) Foreign Application Priority Data
Sep. 3, 2015 (EP) .................................. 15183734

(51) Int. Cl.
A01N 43/54 (2006.01)
B01J 13/18 (2006.01)
A01N 25/28 (2006.01)

(52) U.S. Cl.
CPC ............. *A01N 43/54* (2013.01); *A01N 25/28* (2013.01); *B01J 13/18* (2013.01)

(58) Field of Classification Search
CPC ................... A01N 43/54; A01N 25/28
See application file for complete search history.

(56) References Cited

U.S. PATENT DOCUMENTS

| 4,107,292 | A |   | 8/1978  | Nemeth |
|-----------|---|---|---------|--------|
| 4,557,755 | A | * | 12/1985 | Takahashi ............... A01N 25/28 264/4.7 |
| 5,462,915 | A |   | 10/1995 | Curtis |
| 5,503,781 | A | * | 4/1996  | Sumii ...................... B01J 13/18 252/600 |
| 5,705,174 | A |   | 1/1998  | Benoff |
| 5,733,561 | A |   | 3/1998  | Shimura et al. |
| 5,910,314 | A |   | 6/1999  | Benoff |
| 6,767,865 | B2| * | 7/2004  | Den Tandt ............. A01N 25/04 504/362 |
| 7,232,926 | B2|   | 6/2007  | Hamprecht |
| 7,737,275 | B2|   | 6/2010  | Hamprecht |
| 7,847,097 | B2|   | 12/2010 | Gebhardt |
| 8,357,695 | B2|   | 1/2013  | Schmidt |
| 8,362,026 | B2|   | 1/2013  | Schmidt |
| 8,741,968 | B2|   | 6/2014  | Gottsche |
| 8,999,358 | B2|   | 4/2015  | Amrhein |
| 9,150,538 | B2|   | 10/2015 | Umetani et al. |
| 2003/0119675 | A1 |   | 6/2003 | Wolf |
| 2004/0115280 | A1 |   | 6/2004 | Podszun |
| 2008/0171658 | A1 |   | 7/2008 | Dyllick-Brenzinger |
| 2011/0212837 | A1 |   | 9/2011 | Angermann |
| 2012/0149577 | A1 | * | 6/2012 | Krapp ..................... A01N 43/54 504/243 |
| 2013/0324506 | A1 |   | 12/2013 | Berrebi-Bertrand et al. |
| 2014/0148337 | A1 |   | 5/2014 | Schnabel et al. |

FOREIGN PATENT DOCUMENTS

| CN | 1292640 A | 4/2001 |
|----|-----------|--------|
| CN | 102388864 A | 3/2012 |
| CN | 103814927 A | 5/2014 |
| EP | 0008207 A2 | 2/1980 |
| EP | 2103214 B1 | 10/2013 |
| EP | 2517562 B1 | 1/2017 |
| JP | 2014-514354 A | 6/2014 |
| WO | 9603041 A1 | 2/1996 |
| WO | 0027519 A2 | 5/2000 |
| WO | 0183459 A2 | 11/2001 |
| WO | 03097589 A1 | 11/2003 |
| WO | WO2004013094 A2 | 2/2004 |
| WO | 05054208 A1 | 6/2005 |
| WO | 05102044 A1 | 11/2005 |
| WO | 06094792 A1 | 9/2006 |
| WO | 06094978 A2 | 9/2006 |
| WO | 06125746 A1 | 11/2006 |
| WO | WO2008035379 A2 | 3/2008 |

(Continued)

OTHER PUBLICATIONS

Mollet et al., "Formulation Technology," 1st ed., Wiley-VCH Verlag GmbH, Weinheim 2001, Chapter 6.4, pp. 181-246.
Dietrich et al., "Amino Resin Microcapsules II. Preparation and Morphology," Acta Polymerica, vol. 40, No. 5, (1989), pp. 325-331.
Mollet et al., "Formulation Technology," 1st ed., Wiley-VCH Verlag GmbH, Weinheim 2001, Chapter 14.2.2, pp. 389-398.
Finch et al., "Microencapsulation," Ullmann's Encyclopedia of Industrial Chemistry, 6th Edition, 2001 Electronic Release.
International Search Report, issued in PCT/EP2016/070676, dated Nov. 2, 2016.
International Preliminary Reporton Patentability, issued in PCT/EP2016/070676, dated.
De Lucca, "Harmful fungi in both agriculture and medicine" Revista Iberoamericana De Micologia, vol. 24, Issue 1, 2007, pp. 3-13.

(Continued)

Primary Examiner — Johann R Richter
Assistant Examiner — Danielle Sullivan
(74) Attorney, Agent, or Firm — Marshall, Gerstein & Borun LLP

(57) ABSTRACT

The present invention relates to microparticle compositions comprising saflufenacil, to a method of their preparation and to the use of these microparticle compositions for controlling undesired vegetation. In the microparticle compositions saflufenacil is present in the form of microparticles, which comprise solid saflufenacil, which is surrounded or embedded by an aminoplast polymer.

24 Claims, No Drawings

(56) References Cited

FOREIGN PATENT DOCUMENTS

| WO | 08043835 A2 | 4/2008 |
|---|---|---|
| WO | 08043836 A1 | 4/2008 |
| WO | 11023758 A2 | 3/2011 |
| WO | 11023759 A2 | 3/2011 |
| WO | WO2011042918 A2 | 4/2011 |
| WO | WO2012051036 A1 | 4/2012 |
| WO | 12101070 A1 | 8/2012 |
| WO | WO2013047749 A1 | 4/2013 |
| WO | 13134310 A1 | 9/2013 |
| WO | 16169683 A1 | 10/2016 |
| WO | WO2017067784 A1 | 4/2017 |

OTHER PUBLICATIONS

Basak, et al., "Catalytic enantioselective oxidation of sulfides and disulfides by a chiral complex of bis-hydroxamic acid and molybdenum", Tetrahedron: Asymmetry, vol. 17, Issue 4, Feb. 20, 2006, pp. 508-511.
Senegal, et al., "A General, Practical Palladium-Catalyzed Cyanation of (Hetero)Aryl Chlorides and Bromides", Angewandte Chemie, vol. 52, Issue 38, Sep. 16, 2013, pp. 10035-10039.
Tian, et al., "One-pot synthesis of 4-methylisoquinolines via a sequential Pd-catalyzed Heck reaction and intramolecular cyclization", Organic & Biomolecular Chemistry, vol. 11, Issue 42,2013, pp. 7262-7266.
Yu, et al., "Development of Pd/C-Catalyzed Cyanation of Aryl Halides", The Journal of Organic Chemistry, vol. 76, Issue 2, 2011, pp. 665-668.
Office Action, issued in co-pending U.S. Appl. No. 15/562,448, dated Jan. 22, 2019.
HCAPLUS Abstract 1947:3669 (1947).
Song et al., Microencapsulation Technology and Application, p. 86, Chemical Industry Press, First Edition (Sep. 2001).
Guo, "Textile Finishing", China Textile Press, 1st edition, pp. 329-330 (Dec. 2005).
Wang, "Green Pesticides and Fertilizer Intermediates", Scientific and Technical Documentation Press, First Edition, pp. 283-285 (Apr. 2009).

* cited by examiner

MICROPARTICLE COMPOSITIONS COMPRISING SAFLUFENACIL

This application is a National Stage application of International Application No. PCT/EP2016/070676, Sep. 2, 2016. This application also claims priority under 35 U.S.C. § 119 to European Patent Application No. 15183734.1, filed Sep. 3, 2015.

The present invention relates to microparticle compositions comprising saflufenacil, to a method of their preparation and to the use of these microparticle compositions for controlling undesired vegetation.

BACKGROUND OF INVENTION

Saflufenacil is the INN common name of the herbicidally active phenyluracil compound 2-chloro-5-[3,6-dihydro-3-methyl-2,6-dioxo-4-(trifluoromethyl)-1-(2H)pyrimidinyl]-4-fluoro-N-[[methyl(1-methylethyl)amino]sulfonyl]benzamide. Saflufenacil can be described by the following formula I,

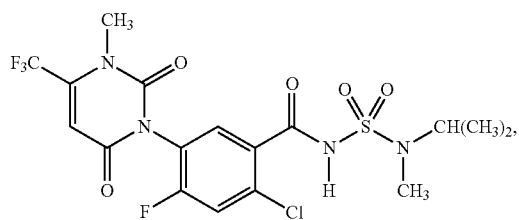

Saflufenacil has been described for the first time in WO 01/083459. Further processes for its preparation are described in WO 03/097589, WO 05/054208, WO 06/097589 and WO 06/125746. A crystalline and essentially solvent-free form of saflufenacil, herein after also referred to as the crystalline anhydrate form, has been described in WO 08/043835. Two crystalline hydrate forms of saflufenacil have been described in WO 08/043836. Saflufenacil is only sparingly soluble in water.

Saflufenacil is a highly active herbicide which efficiently inhibits growth of undesirable vegetation at low application rates. Unfortunately, its selectivity is not always satisfactory and its use in crops is somewhat limited. Moreover, the saflufenacil does not have sufficient residual activity and thus regrowth may occur shortly after it has been applied.

Herbicides, such as saflufenacil, are normally applied in the form of dilute aqueous spray liquors, which are prepared by diluting a concentrate formulation of the herbicide with water. For this purpose, pesticide compounds may be formulated in solid forms, such as wettable powders (WP) and water-dispersible granules (WG), as well as in liquid forms, such as emulsions, emulsifiable concentrates (EC), suspoemulsions (SE) or suspension concentrates (SC). For efficient encapsulation, it is of particular importance that the formulations can be easily diluted with water and that the dilution remains stable for a certain time without separation of the active ingredient, as this may cause clogging of the spraying nozzles. For ecological reasons it is preferred that the formulation does not contain large amounts of organic solvents, which principally favours solid formulations and aqueous SC formulations.

Despite the aforementioned advantages associated with the usage of SCs, there are a number of problems known to the skilled person which are sometimes encountered with SCs as a result of settling during prolonged storage or storage at elevated temperatures, the resistance of settled particles to re-suspension and the formation of crystalline material upon storage. As a consequence, the formulations may be difficult to handle and the bioefficacy may be inconsistent.

When trying to formulate saflufenacil one faces several problems. Saflufenacil carries a N-amino-sulfonylcarboxamide side-chain which might undergo hydrolysis at basic pH values. Apart from that, saflufenacil is capable of existing in different crystalline and non-crystalline modifications, namely amorphous forms, crystalline hydrates and a crystalline anhydrate, which may undergo uncontrolled conversion into another crystalline form. This conversion in turn may lead to coarsening of the saflufenacil particles, in particular when formulated as suspension concentrate. These factors might result in a reduced chemical and physical stability of the formulations, an effect that is particularly pronounced when the formulations are stored over prolonged periods of time and/or at elevated temperatures. Said factors may also lead to poor dilution properties as the coarse saflufenacil particles are prone to separate from the diluted formulation.

Several stable aqueous agricultural formulations of saflufenacil have been described so far. WO 2011/023759 describes an aqueous suspension concentrate formulation containing saflufenacil-anhydrate and a combination of certain anionic and non-ionic surfactants. WO 2011/023758 describes an aqueous suspension concentrate formulation of saflufenacil which additionally contains glyphosate as a co-herbicide. Although, these formulations are stable, they do not solve the problem of poor crop selectivity and insufficient residual activity.

It is principally known to provide pesticidally active compounds in the form of micrcocapsule formulations (see H. Mollet, A. Grubenmann "Formulation Technology" 1$^{st}$ ed., Wiley-VCH Verlag GmbH, Weinheim 2001, Chapter 6.4 and Chapter 14.2.2). Microencapsulation can be principally achieved by coacervation techniques, spray drying, fluidized-bed coating, electrostatic microencapsulation or in-situ polymerization. These techniques provide active compound particles, wherein the active compound is surrounded by a polymeric wall material.

The most common method for microencapsulation of agrochemical materials is the interfacial polymerization. In this process, a first reactant, e.g. a polyfunctional isocyanate or acid chloride, is dissolved in the liquid active ingredient or a solution thereof, which is then dispersed in water and subjected to polymerization by addition of a polyfunctional compound having a complementary reactivity with regard to the first reactant, e.g. an diamine or diol (see H. Mollet, A. Grubenmann, loc. cit. page 394 and U.S. Pat. Nos. 4,107, 292, 5,705,174, 5,910,314, WO 0027519, EP 8207, U.S. 2004/115280). The polymerization occurring at the interface between the active substance and the aqueous phase completely encloses the fine droplets of active substance in a thin membrane of polyurea or polyamide.

A further in-situ polymerization technique includes microencapsulation of liquids by using aminoplasts, such as melamine formaldehyde resins (MF resisn) or urea formaldehyde resins (UF resins) or melamine formaldehyde urea resins (MUF resins). The aminoplast resins are used in the form of their prepolymers or pre-condensates, which are added to an aqueous emulsion of the material to be encapsulated and cured by heating and/or altering the pH of the reaction mixture to effect polymerization of the prepolymers. Thereby, an aqueous suspension of the microcapsules are obtained, where the particles of the encapsulated material are surrounded by or embedded in an aminoplast polymer. A survey of this method is given in Acta Polymerica 40, (1989) No. 5, pp. 325-331 and C. A. Finch, R. Bodmeier, Microencapsulation, Ullmann's Encyclopedia of Industrial Chemistry, 6$^{th}$ Edition, 2001 Electronic Release).

Microencapsulation of pesticides using in-situ polymerization of aminoplasts pre-condensates have been described several times. For example, U.S. Pat. No. 4,557,755 describes the microencapsulation of water-insoluble pesticides by polymerizing an aminoplast pre-condensate, such as a melamine formaldehyde or melamine urea formaldehyde resin in an aqueous suspension of the pesticide compound in the presence of a cationic urea resin. The method is suggested for certain insecticides and fungicides.

U.S. Pat. No. 5,462,915 describes an improved process for microencapsulation of water-insoluble pesticides, which comprises adding to a suspension of the pesticide a liquid aminoplast prepolymer and curing the prepolymer at temperatures of above 100° C. The method was applied for microencapsulation of water-insoluble salts of dicamba. A similar process is known from WO 00/27519, which was applied for microencapsulation of carbofuran.

WO 96/03041 describes a microcapsule composition of pesticides, wherein the microcapsules have an outer aminoplast layer and an inner wax coating deposited around pesticide compound.

Modern techniques of microencapsulation include the radical suspension polymerization of water-insoluble acrylate monomers with (meth)acrylic acid and optionally polyfunctional monomers in the presence of an o/w-emulsion of the pesticide compound (see e.g. WO 2012/101070) or the radical emulsion polymerization of an aqueous monomer emulsions, wherein the pesticide is dissolved or suspended in the monomer droplets (see e.g. WO 2005/102044, WO2006/094792, WO 2006/094978). However, considerable amounts of polymer are required, which may exceed the amount of pesticide.

Although microencapsulation may improve the acute toxicity of a pesticide or reduce degradation, it is often difficult to achieve. In particular, aggregation of the pesticide particles during or after encapsulation is the main problem, if one encapsulation method, which may work for a particular pesticide compound, does not necessarily work for another pesticide compound. When trying to encapsulate a solid material in an aqueous suspension of the solid material by an in-situ-polymerization technique, the solid material tends to agglomerate thereby forming large particles of active ingredient particles, which are embedded in the polymer matrix. A thus obtained suspension is usually no longer suitable for agricultural use. So fat, it was not possible to efficiently encapsulate solid pesticide particles by using small amounts of an encapsulating polymer.

SUMMARY OF THE INVENTION

It is an object of the present invention to provide a formulation of saflufenacil that shows both high physical and chemical stability over prolonged storage periods while maintaining its biological efficacy. Moreover, it should also be compatible with tank-mix partners which are commonly combined with saflufenacil. Upon dilution with water, the formulation should give a stable aqueous composition of saflufenacil without forming coarse material or a supernatant liquid.

It was surprisingly found that microparticle compositions of solid saflufenacil, wherein solid saflufenacil is surrounded or embedded by an aminoplast polymer provide for an improved residual activity of saflufenacil. Moreover, these microparticle compositions can be simply prepared starting from an aqueous suspension of solid saflufenacil.

Surprisingly, the amounts of aminoplast polymer required for efficient encapsulation of saflufenacil are quite small and normally significantly lower than the amount of saflufenacil, which is encapsulated.

Therefore, a first aspect of the invention relates to microparticle compositions, comprising saflufenacil, wherein saflufenacil is present in the form of microparticles, which comprise solid saflufenacil, which is surrounded or embedded by an aminoplast polymer.

Like non-encapsulated saflufenacil, the microparticle compositions of the present invention provide for high herbicidal activity. Moreover, the microparticle compositions of the present invention provide for improved residual activity of saflufenacil. Apart from that, the microparticle compositions of the present invention may provide for better crop-safety.

In the microparticle compositions of the present invention, saflufenacil is less prone to degradation. Thus, the microparticle compositions of the present invention provide for both high physical and chemical stability over prolonged storage periods, while maintaining the biological efficacy of saflufenacil. Moreover, microparticle compositions of the present invention can be easily formulated. Furthermore, microparticle compositions of the present invention in the form of aqueous suspensions provide for improved tank-mix compatibility, and thus can be readily tank mixed with other formulations of pesticides and do not negatively interact with other formulations regarding their dilution stability.

It was also surprisingly found that solid saflufenacil can be efficiently microencapsulated by using aminoplast precondensates and performing the process described hereinafter. Therefore, a second aspect of the present invention relates to a process for preparing the microparticle compositions as described herein, which process comprises the following steps:

i) providing an aqueous suspension of solid saflufenacil particles;
ii) adding an aminoplast pre-condensate to the aqueous suspension of the saflufenacil particles;
iii) effecting the polycondensation of the aminoplast pre-condensate, e.g. by heating the aqueous suspension of step ii) at a pH, where the polycondensation of the aminoplast pre-condensate will occur at the reaction temperature.

This process results in a stable aqueous suspension, wherein saflufenacil is present in the form of microparticles, which comprise solid saflufenacil, which is surrounded or embedded by an aminoplast polymer. From this, the microparticles can be isolated, if necessary. Surprisingly, this process does not result in significant agglomeration of the saflufenacil particles, as was observed for other in-situ polymerization techniques.

DETAILED DESCRIPTION OF INVENTION

In the microparticle composition of the invention saflufenacil is present in the form of microparticles, which comprise solid saflufenacil as a core material. In the microparticles solid saflufenacil forms the core material which is surrounded or embedded by at least one aminoplast polymer. In this context, it has to be understood that the aminoplast polymers may form a regular or irregular shell which surrounds or embeds the core material. The microparticles may have a single solid core formed by the saflufenacil and a shell or matrix formed by the aminoplast polymer. It may, of course, also be possible that the microparticles have a "domain structure" which comprises a certain number of solid saflufenacil particles, e.g. 3 to 10 particles, of amorphous or crystalline saflufenacil, which are embedded by the aminoplast polymer. It is not necessary that the aminoplast polymer forms a completely closed shell. Frequently, however, the shell will completely surround the core material like a membrane, thereby forming a barrier between the core material and the surrounding material.

Aminoplast polymers, which are also termed amino resins, amino condensation resins or amido resins are polycondensation products of one or more aldehydes, such as formaldehyde, acetaldehyde, propanal, glyoxal or glutaraldehyde, with one or more amino compounds having usually at least two primary amino groups, such as urea, thiourea, melamine, which may be wholly or partially etherified, cyanoguanamine (=dicyandiamide) and benzoguanamine. Examples of aminoplast polymers are polycondensates of melamine and formaldehyde (melamine-formaldehyde resins or MF resins), including resins derived from wholly or partially etherified melamine-formaldehyde condensates, urea-formaldehyde resins (UF resins), thiourea-formaldehyde resins (TUF resins), polycondensates of melamine, urea and formaldehyde (MUF resins), including resins derived from wholly or partially etherified melamine-urea-formaldehyde condensates, polycondensates of melamine, thiourea and formaldehyde (MTUF resins, including resins derived from wholly or partially etherified melamine-thiourea-formaldehyde condensates, urea-glutaraldehyde resins, benzoguanamine-formaldehyde polycondensates, dicyandiamide formaldehyde polycondensates and urea-glyoxal polycondensates. Suitable aminoplast polymers for microencapsulation are known and can be found, inter aria, in Kirk-Othmer, Encyclopedia of Chemical Technology, 3rd edition, Vol. 2, pp. 440-469, the prior art cited in the introductory part, U.S. Pat. No. 4,918,317, EP 26914, EP 218887, EP 319337, EP 383,337, EP 415273, DE 19833347, DE 19835114 and WO 01/51197.

In UF and TUF resins, the molar ratios of urea or thiourea to formaldehyde are generally in the range from 1:0.8 to 1:4, in particular from 1:1.5 to 1:4, especially from 1:2 to 1:3.5. If glutaraldehyde is used instead of formaldehyde, the molar ratios of urea or thiourea to glutaraldehyde may in particular be in the range from 1:1.2 to 1:3, especially in the range from 1:1.5 to 1:2.5.

In MF and MUF resins, the molar ratios of melamine to formaldehyde are generally in the range from 1:1.5 to 1:10, in particular from 1:3 to 1:8 preferably 1:4 to 1:6, In MUF and MTUF resins, the molar ratios of melamine+ urea or thiourea to formaldehyde are generally in the range from 1:0.8 to 1:9, in particular from 1:2 to 1:8 preferably 1:3 to 1:6. The molar ratio of urea or thiourea to melamine may be in the range from 50:1 to 1:100 and in particular from 30:1 to 1:30.

In the preparation of the aforementioned aminoplast resins, the pre-condensates may be used in the form of etherified pre-condensates of amino compound and aldehyde. In these etherified pre-condensates the methylol groups formed by the reaction of the amino groups with formaldehyde with an alkanol or an alkandiol, in particular with a $C_1$-$C_4$-alkanol, such as methanol, ethanol, n-propanol or n-butanol, in particular methanol, or a $C_2$-$C_4$-alkandiol, such as ethylene glycol. The degree of etherification of these resins can be adjusted by the molar ratio of amino groups to alkanol which is typically in the range from 10:1 to 1:10, preferably in the range from 2:1 to 1:5.

The aminoplast polymer material, which surrounds or embeds the solid saflufenacil, is most preferably selected from the group consisting of melamine-formaldehyde resins, including melamine-formaldehyde resins derived from wholly or partially etherified melamine-formaldehyde condensates, and urea-formaldehyde resins and mixtures thereof. Especially, the aminoplast polymer material, which surrounds or embeds the solid saflufenacil, is a melamine-formaldehyde resin, in particular a melamine-formaldehyde resin, which is derived from wholly or partially etherified melamine-formaldehyde condensates, which may contain small amount, e.g. 1 to 20 mol. %, based on melamine, of urea.

In the microparticle compositions of the invention, the amount of aminoplast polymer material, which surround or embed the solid saflufenacil, will generally not exceed the amount of saflufenacil contained in the composition and is preferably at most 40% by weight, in particular at most 35% by weight and especially at most 30% by weight or at most 25% by weight, based on the total amount of saflufenacil and aminoplast polymers. The amount of aminoplast polymer material, which surround or embed the solid saflufenacil, is preferably from 0.5 to 40% by weight, in particular from 1 to 35% by weight and especially from 5 to 25% by weight, based on the total capsule weight, i.e. based on the total amount of saflufenacil and aminoplast polymers. The polymer material of the microparticle composition of the invention, which surrounds or embeds the solid saflufenacil, may comprise further water-insoluble polymers. However, the amount of such polymers will generally not exceed 20% of the total amount of encapsulating polymer material, and will preferably not exceed 10% by weight of the total amount of polymer material, which surrounds or embeds the solid saflufenacil.

The solid saflufenacil, which is surrounded or embedded by at least one aminoplast polymer, may be any known form of solid saflufenacil, including amorphous saflufenacil and in particular crystalline saflufenacil, e.g. the crystalline anhydrate of saflufenacil as described in WO 08/043835 or a crystalline hydrate of saflufenacil as described in WO 08/043836.

In addition to the solid saflufenacil, the core material of the microparticles may contain an oil, e.g. a hydrocarbon solvent, such a an aromatic, paraffinic or isoparaffinic hydrocarbon, having preferably a boiling point above 100° C., a vegetable oil, such as corn oil, rapeseed oil, or a fatty acid ester, such as $C_1$-$C_{10}$-alkylester of a $C_{10}$-$C_{22}$-fatty acid, in particular methyl or ethyl esters of vegetable oils. such as rapeseed oil methyl ester or corn oil methyl ester. In a particular embodiment, the core material does not contain an oil as defined herein or less than 10% by weight, based on the weight of the core material, of an oil. In particular, the core does not contain an oil.

In addition to the solid saflufenacil, the core material of the microparticles may further contain a further pesticide compound, in particular a herbicide compound or a safener, having preferably a reduced water solubility, which generally does not exceed 10 g/l, in particular 5 g/l or even 1 g/l at 25° C. (deionised water). In particular, solid saflufenacil makes up at least 80%, in particular at least 90% of the pesticides contained in the microparticles.

The microparticles of the present invention are discrete particles having usually a particle size of less than 50 μm. Preferably, the particle size of the microparticles, i.e. their diameter, will in general not exceed 40 µm, preferably not exceed 35 µm and in particular not exceed 30 µm. The particle size given is the so called $d_{90}$-value, which has to be understood as the value that is not exceeded by the diameters of at least 90% by weight of the microparticles. The microparticles have an average particle diameter, herein also termed $d_{50}$-value, ranging from 1 to 25 µm, in particular from 1.5 to 20 µm, especially from 2 to 10 µm. The $d_{50}$-value is defined as the value that is above the diameters of 50% by weight of the particles and below the diameters of 50% by weight of the particles. The $d_{90}$ value as well as the $d_{50}$ value can be calculated from the particle size distribution of the microparticles. Generally, the $d_{10}$-value of the particles, i.e. the value of diameters which at least 10% by weight of the microparticles exceed, will be at least 0.5 µm and may e.g. be in the range from 0.5 µm 10 µm, in particular from 1 to 5 µm. The particle size distribution of the microparticles (i.e. the diameters) can be determined by conventional methods such as dynamic or static light-scattering of an aqueous dispersion of the microparticle composition, e.g. at 25° C. and a concentration in the range of 0.1 to 1% by weight.

In a preferred embodiment of the invention, the microparticle composition contains at least one anionic polymeric surface-active substance A, hereinafter anionic polymeric surfactant, which contains a plurality of anionic groups, such as carboxylate groups, sulfonate groups, phosphonate groups, sulfate groups and/or phosphate groups. Preferably, the anionic groups are selected from sulfonate groups. Examples for polymeric surfactants A include the surfactants of the following groups A1 to A3, including the salts thereof:

A.1 lignin based sulfonic acids, such as lignosulfonic acid, ethoxylated ignosulfonic acid or oxidized lignins;

A.2 arylsulfonic acid formaldehyde condensates and arylsulfonic acid formaldehyde urea condensates, such as naphthalene sulfonic acid formaldehyde condensates, phenol sulfonic acid formaldehyde condensates, cresol sulfonic acid formaldehyde condensates etc.;

A.3 and homo- or copolymers of monoethylenically unsaturated monomers M1 having a sulfonic acid group optionally with one or more comonomers M2 different from monomers M1.

The anionic groups in these anionic polymeric surfactants may be partially or fully neutralized. Suitable counter ions are alkalimetal ions, such as sodium, potassium, earth alkaline ions such as magnesium or calcium, and ammonium. In case of anionic polymeric surfactants having a sulfonate group, the anionic groups are preferably at least partly neutralized.

The polymeric surfactants are in particular selected from groups A2. and A.3, especially from group A.3.

Preferably, the polymeric surfactant A.3 is selected from homo- and copolymers made of
i) at least one monoethylenically unsaturated monomer M1 having a sulfonic acid group, such as vinylsulfonic acid, allylsulfonic acid, styrene sulfonic acid, vinyltoluene sulfonic acid, (meth)acrylate monomers having a sulfonic acid group, such as 2-acryloxyethylsulfonic acid, 2-acryloxypropylsulfonic or 4-acryloxybutylsulfonic acid, and (meth)acrylamide monomer having a sulfonic acid group, such as 2-acrylamidoethylsulfonic acid, 2-acrylamidopropylsulfonic acid or 2-acrylamido-2-methylpropane sulfonic acid
ii) and optionally one or more monoethylenically unsaturated comonomers M2 different from monomers M1, such as styrene, $C_1$-$C_4$-alkylacrylates, $C_1$-$C_4$-alkylmethacrylates, acrylamide, methacrylamide, acrylic acid, methacrylic acid, $C_1$-$C_4$-alkylacrylates, $C_1$-$C_4$-alkylmethacrylates.

In particular groups of embodiments, the polymeric surfactant A comprises or is selected from homo- and copolymers of group A.3, in particular from homo- and copolymers made of
i) monomers M1, which are selected from (meth)acrylate monomers having a sulfonic acid group, such as 2-acryloxyethylsulfonic acid, 2-acryloxypropylsulfonic or 4-acryloxybutylsulfonic acid, and (meth)acrylamide monomer having a sulfonic acid group, such as 2-acrylamidoethylsulfonic acid, 2-acrylamidopropylsulfonic acid or 2-acrylamido-2-methylpropane sulfonic acid,
ii) and optionally one or more monoethylenically unsaturated comonomers M2 different from monomers M1, such as styrene, $C_1$-$C_4$-alkylacrylates, $C_1$-$C_4$-alkylmethacrylates, acrylamide, methacrylamide, acrylic acid, methacrylic acid, $C_1$-$C_4$-alkylacrylates, $C_1$-$C_4$-alkylnnethacrylates.

Especially, the polymeric surfactant A.3 comprises or is selected from homo- and copolymers of
i) monomers M1, which is 2-acrylamido-2-methylpropane sulfonic acid,
ii) and optionally one or more monoethylenically unsaturated comonomers M2 different from monomers M1, such as styrene, $C_1$-$C_4$-alkylacrylates, $C_1$-$C_4$-alkylmethacrylates, acrylamide, methacrylamide, acrylic acid, methacrylic acid, $C_1$-$C_4$-alkylacrylates, $C_1$-$C_4$-alkylnnethacrylates.

In these preferred, particular preferred or especially preferred polymeric surfactants A.3, the amount of monomers M1 is preferably at least 50% by weight, based on the total amount of monomers forming the polymeric surfactant. Even more preferred are polymeric surfactants A, which are homo- or copolymers of monomers M1, wherein the amount of monomers M1 is at least 90% by weight, based on the total amount of monomers forming the polymeric surfactant. These polymers are known, e.g. from commercially available under the tradenames Lupasol S and Lupasol PA 140 (from BASF SE).

In another particular groups of embodiments, the polymeric surfactant A comprises or is selected from surfactants of group A.2, i.e. arylsulfonic acid formaldehyde condensates and arylsulfonic acid formaldehyde urea condensates, in particular from naphthalene sulfonic acid formaldehyde condensates.

The amount of the anionic polymeric surfactant A in the composition is preferably from 0.1 to 50% by weight, in particular from 2 to 40% by weight and most preferred from 3 to 30% by weight, based on the total amount of saflufenacil and aminoplast polymer.

It was found beneficial, if the polymeric surfactant A is combined with one or more further anionic surfactants B different therefrom, which provide for the stabilization of an aqueous formulation comprising the microparticles. Suitable anionic surface-active compounds B are surfactants having one anionic group, which is selected from phosphate or phosphonate groups and sulfate or sulfonate groups, the latter compounds being preferred. These surfactants B will usually be included into the microparticle composition in the form of their salts, in particular the sodium, potassium or ammonium salts. Examples of anionic surfactants B include the salts of alkylsulfonates, alkylsulfates, alkylphosphates, semi-esters of alkoxylated alkanols with sulfuric acid or phosphoric acid, alkylarylsulfonates, alkylarylphosphates, semi-esters of alkoxylated alkylphenols with sulfuric acid or phosphoric acid and semi-esters of alkoxylated mono-, di- or tristyrylphenols with sulfuric acid or phosphoric acid. Amongst these anionic surfactants B, those of the formula 81) are preferred:

$$R\text{—}(O\text{—}A)_m\text{—}O\text{—}X \qquad (I)$$

wherein

R is a hydrocarbon radical having from 8 to 40 carbon atoms and preferably from 12 to 30 carbon atoms and optionally one oxygen atom;

A is independently from one another 1,2-ethylene, 1,2-propylene or 1,3-propylene, especially 1,2-ethylene;

m is from 0 to 50, preferably from 0 to 30 and especially preferred from 0 to 20; and X is $SO_3M$ or $PO_3M_2$ with M being selected from H, alkaline metal ions, such as K and Na, alkaline earth metal ions, such as ½ Ca and ½ Mg and ammonium. Preferably, M is an alkaline metal ion and especially sodium.

Examples of suitable hydrocarbon radicals R having from 8 to 40 carbon atoms are alkyl having from 8 to 40 and preferably from 12 to 30 carbon atoms, phenyl, which may be substituted with one or two alkyl radicals having from 4 to 20 carbon atoms, phenyl, which is substituted with a phenoxy radical, wherein phenyl and/or phenoxy may contain an alkyl radical having from 4 to 20 carbon atoms, tristyrylphenyl radical etc. In a preferred embodiment of the present invention the radical R in formula I is a tristyrylphenyl radical.

Preference is given to anionic surfactants B which are of the formula (I), wherein R, m and X have the following meanings:

R is alkyl having from 8 to 30, in particular from 10 to 20 carbon atoms, m is 0, X is $SO_3M$ with m being selected from alkaline metal ions, such as K and Na, alkaline earth metal ions, such as ½ Ca and ½ Mg and ammonium. Preferably, M is an alkaline metal and especially sodium.

If present, the amount of anionic surfactant B, in particular the surface-active compound of the formula (I), is preferably from 0.1 to 10% by weight, in particular from 0.3 to 7% by weight and most preferred from 0.5 to 5% by weight, based on the total amount of saflufenacil and aminoplast polymer. If present, the amount of anionic surfactant B, in particular the surface-active compound of the formula (I), is preferably chosen such that the weight ratio of anionic polymeric surfactant A to anionic surfactant B is from 1:1 to 20:1 in particular from 2:1 to 10:1.

The compositions according to the invention may also contain a nonionic surface-active compound (nonionic surfactant). Preferred nonionic surfactants include the neutral surface-active compounds of the formula (II),

$$R'\text{—}(O\text{—}B)_n\text{—}OH \qquad II$$

wherein

R' is a hydrocarbon radical having from 8 to 40 and more preferably from 12 to 30 carbon atoms and optionally one oxygen atom, B is $C_2$-$C_4$-alkane-1,2-diyl, such as 1,2-ethylene, 1,2-propylene or 1,2-butylene or a combination thereof and more preferred 1,2-ethylene or a combination thereof with 1,2-propylene, and n is from 3 to 100, preferably from 4 to 50 and more preferred from 5 to 40.

Examples of suitable hydrocarbon radials R' include the radicals mentioned for R. In a preferred embodiment of the invention the radical R' is a phenyl radical being substituted with one $C_4$-$C_{18}$-alkyl group.

If present, the amount of nonionic surfactant, in particular the surface-active compound of the formula (II), is preferably from 1 to 150 g/L, in particular from 2 to 60 g/L in the final formulation. In one particular embodiment of the invention, the composition does not contain nonionic surfactant or less than 1% by weight of nonionic surfactant, in particular less than 0.5% by weight of nonionic surfactant, based on the total amount of saflufenacil and aminoplast polymer.

In particular groups of embodiments, the microparticle composition is in the form of an aqueous suspension. Such a suspension contains the microparticles of solid saflufenacil as a disperse phase, and an aqueous medium as the continuous phase. The aqueous suspension may be obtained by the process for preparing the microparticle composition as described herein. It may also be obtained by re-dispersing a solid microparticle composition as described herein in an aqueous medium.

The term "aqueous medium" stands for the liquid phase of the composition and comprises an aqueous solvent and optionally compounds dissolved therein, e.g. surfactants as mentioned above, and if present, conventional one or more conventional formulation additives, such as thickeners or biocides. The aqueous solvent of the aqueous suspension is either water or a mixture thereof with a water-miscible organic solvent, such as $C_1$-$C_4$-alkanols, e.g. methanol, ethanol, n-propanol, isopropanol, n-butanol, 2-butanol, isobutanol, or tert. butanol, $C_2$-$C_5$-alkanediols and $C_3$-$C_8$-alkanetriols, preferably from the group consisting of ethylene glycol, 1,2-propanediol, 1,3-propanediol, glycerol and 1,4-butanediol. Generally, the amount of water in the aqueous solvent is at least 50% by weight, in particular at least 80% by weight or at least 90% by weight, based on the aqueous solvent. The aqueous solvent may consist mainly of water, i.e. water makes up at least 95% by weight of the total amount of solvent present in the suspension. The aqueous solvent may also be a mixture of the aforementioned water-miscible organic solvent and water. In the latter case, the weight ratio of water to water-miscible organic solvent in the aqueous solvent preferably is in the range of from 99:1 to 1:1; more preferably in the range of from 50:1 to 3:1; and most preferably in the range of from 20:1 to 4:1. Expressed differently the amount of organic solvent may be from 1 to 50% by weight, more preferably from 2 to 25% by weight, and most preferably from 5 to 20% by weight, based on the total weight of the aqueous solvent.

The aqueous suspension will usually contain the microparticles in an amount of at least 5% by weight and the amount may be as high as 50% by weight or even higher, in each case based on the total weight of the aqueous suspension and calculated as the total amount of aminoplast-polymer and saflufenacil. Frequently, the aqueous suspension will contain the microparticles in an amount from 10 to 45% by weight, in particular from 20 to 40% by weight, in each case based on the total weight of the aqueous suspension and calculated as the total amount of aminoplast-polymer and saflufenacil. The concentration of saflufenacil in the aqueous suspension will frequently be in the range from 5 to 40% by weight, in particular from 15 to 30% by weight, based on the total weight of the aqueous suspension.

If present, the concentration of the polymeric anionic surfactant A in the aqueous suspension will frequently be in the range from 0.1 to 15% by weight, in particular from 0.2 to 6% by weight, based on the total weight of the aqueous suspension of the microparticles.

If present, the concentration of the anionic surfactant B in the aqueous suspension will frequently be in the range from 0.1 to 15% by weight, in particular from 0.2 to 6% by weight, based on the total weight of the aqueous suspension of the microparticles.

The aqueous compositions according to the invention may also comprise customary formulation auxiliaries, such as viscosity-modifying additives (thickeners), antifoam agents, preservatives, buffers, inorganic dispersants, etc., which are usually employed in aqueous formulations of herbicides. Such auxiliaries may be incorporated into the aqueous suspension after step iii) of the preparation process described herein has been carried out. The amount of additives will generally not exceed 10% by weight, in particular 5% by weight of the total weight of the aqueous suspension.

Suitable inorganic dispersants, also termed anticaking agents, for preventing agglutination of the microparticles, are silica (such as, for example Sipernat® 22 from Degussa), alumina, calcium carbonate and the like. In the context of the present invention silica is a preferred inorganic dispersant. The concentration of inorganic dispersants in the final suspension will generally not exceed 2% by weight, based on the total weight of the final suspension, and, if present, it is preferably in the range from 0.01 to 2% by weight, in particular from 0.02 to 1.5% by weight and especially from 0.1 to 1% by weight, based on the total weight of the final formulation.

Suitable thickeners are compounds which affect the flow behavior of the suspension concentrate and may assist in stabilizing the aqueous suspension of the microparticles against caking. Mention may be made, in this connection, for example, of commercial thickeners based on polysaccharides, such as methylcellulose, carboxymethylcellulose, hydroxypropylcellulose (Klucel® grades), Xanthan Gum (commercially available e.g. as Kelzan® grades from Kelco or Rhodopol® grades from Rhodia), synthetic polymers, such as acrylic acid polymers (Carbopol® grades), polyvinyl alcohol (e.g. Mowiol® and Poval® grades from Kuraray) or polyvinyl pyrrolones, silicic acid or phyllosilicates, such as montmorillonite and bentonites, which may be hydrophobized, (commercially available as Attaclay® grades and Attaflow® grades from BASF SE; or as Veegum® grades and Van Gel® grades from R. T. Vanderbilt). In the context of the present invention, Xanthan Gum is a preferred thickener. The concentration of thickeners in the aqueous suspension will generally not exceed 2% by weight, based on the total weight of the aqueous suspension, and is preferably in the range from 0.01 to 2% by weight, in particular from 0.02 to 1.5% by weight and especially from 0.1 to 1% by weight, based on the total weight of the aqueous suspension or the final formulation, respectively.

Antifoam agents suitable for the compositions according to the invention are, for example, silicone emulsions (such as, for example, Silicone SRE-PFL from Wacker or Rhodorsil® from Bluestar Silicones), polysiloxanes and modified polysiloxanes including polysiloxane blockpolymers such as FoamStar® SI and FoamStar® ST products of BASF SE, long-chain alcohols, fatty acids, organofluorine compounds and mixtures thereof.

Suitable preservatives to prevent microbial spoiling of the compositions of the invention include formaldehyde, alkyl esters of p-hydroxybenzoic acid, sodium benzoate, 2-bromo-2-nitropropane-1,3-diol, o-phenylphenol, thiazolinones, such as benzisothiazolinone, 5-chloro-2-methyl-4-isothiazolinone, pentachlorophenol, 2,4-dichlorobenzyl alcohol and mixtures thereof. Commercially available preservatives that are based on isothiazolinones are for example marketed under the trademarks Proxel® (Arch Chemical), Acticide® MBS (Thor Chemie) and Kathon® MK (Rohm & Haas).

If appropriate, the compositions according to the invention, in particular the aqueous suspensions, may comprise buffers to regulate the pH. Examples of buffers are alkali metal salts of weak inorganic or organic acids such as, for example, phosphoric acid, boric acid, acetic acid, propionic acid, citric acid, fumaric acid, tartaric acid, oxalic acid and succinic acid.

In addition, the compositions according to the invention, in particular the aqueous suspensions, can be formulated with conventional binders, for example aqueous polymer dispersions, water-soluble resins, for example water-soluble alkyd resins, or waxes.

The compositions of the invention may also contain one or more adjuvants. Suitable adjuvants are known to skilled persons and include surfactants, crop oil concentrates, spreader-stickers, wetting agents, and penetrants.

In other particular groups of embodiments, the microparticle composition is in the form of solid composition. Such a solid composition contains the microparticles of solid saflufenacil, optionally one or more surfactants, in particular the polymeric surfactant A and optionally the anionic surfactant B, and optionally an inert solid carrier material. The solid compositions may e.g. be redispersible powders, water-dispersible granules wettable powders and the like.

Solid carriers include e.g. mineral earths, such as silicas, silica gels, silicates, talc, kaolin, limestone, lime, chalk, bole, loess, clay, dolomite, diatomaceous earth, calcium sulfate, magnesium sulfate, magnesium oxide, ground synthetic materials, fertilizers such as ammonium sulfate, ammonium phosphate, ammonium nitrate, ureas, and products of vegetable origin, such as cereal meal, tree bark meal, wood meal and nutshell meal, cellulose powders, or other solid carriers.

The solid compositions according to the invention may also comprise customary formulation auxiliaries, such as antifoam agents, preservatives, buffers, inorganic dispersants, etc., which are usually employed in solid formulations of herbicides. Such auxiliaries may be incorporated into the solid formulation at any conventional stage of their preparation process. The amount of additives will generally not exceed 10% by weight, in particular 5% by weight of the total weight of the solid composition.

The solid composition may be obtained from an aqueous suspension which is primarily formed in the process for preparing the microparticle composition as described herein by removing the aqueous phase from the aqueous suspension. Removal of the aqueous phase can be achieved by either separating the aqueous phase from the solid microparticles, e.g. by centrifugation or filtration. Preferably, the aqueous phase is removed by an evaporation process, such as spray drying or freeze drying.

As outlined above, the process for producing the composition comprises a first step, where an aqueous suspension of saflufenacil particles is provided. For this, solid saflufenacil is suspended in an aqueous solvent, in particular in water. The aqueous solvent may contain one or more surfactants, in particular at least one polymeric surfactant A, which is assumed to act as a protective colloid, and optionally one or more anionic surfactants B.

Preferably, the particle size of the saflufenacil particles in the aqueous suspension prior to encapsulation is less than 45

µm, in particular it will not exceed 40 µm, preferably not exceed 30 µm and in particular not exceed 25 µm. The particle size given is the so called $d_{90}$-value. Preferably the active substance particles have an average particle diameter, herein also termed $d_{50}$-value, ranging from 0.5 to 25 µm, in particular from 1 to 20 µm, especially from 1.5 to 15 µm. The $d_{50}$-value is defined as the value that is above the diameters of 50% by weight of the particles and below the diameters of 50% by weight of the particles. The $d_{10}$-value is preferably at least 0.5 µm and may e.g. be in the range from 0.5 µm 10 µm, in particular from 1 to 5 µm. The $d_{90}$ value as well as the $d_{50}$ value can be calculated from the particle size distribution of the saflufenacil particles which can be determined by conventional methods such as dynamic or static light-scattering at 25° C. and a concentration in the range of 0.1 to 1% by weight.

It has been found beneficial, if the polycondensation is initiated or effected in the presence of at least one anionic polymeric surfactant A, in particular an anionic polymeric surfactant A which comprises or is selected from the polymeric surfactants of group A.3. If present, the concentration of the polymeric anionic surfactant A, which is in particular selected from the surfactants of group A.3, in the aqueous suspension of step i) will frequently be in the range from 0.1 to 10% by weight, in particular from 1 to 6% by weight, based on the total weight of the aqueous suspension.

It has been found beneficial, if the aqueous suspension of step i) also contains at least one anionic surfactant B, in particular an anionic surfactant which comprises or is selected from the surfactants of the formula (I). If present, the concentration of the anionic surfactant B in the aqueous suspension of step i) will frequently be in the range from 0.01 to 2% by weight, in particular from 0.1 to 1% by weight, based on the total weight of the aqueous suspension.

The aqueous suspension of the saflufenacil particles can be provided by analogy to known methods of preparing aqueous suspensions of saflufenacil, e.g. as described in WO 2011/023759.

In one embodiment, step i) comprises a step i.a) and a step i.b). In step i.a) solid saflufenacil, in particular a crystalline form of saflufenacil, such as saflufenacil anhydrate or one of the hydrate forms, and the aqueous solvent and optionally at least a part of the surfactant are mixed in any conventional mixing device which is capable of providing sufficient shear to form the desired suspension. Suitable mixing devices include in particular high shear mixers, such as Ultra-Turrax apparatus, static mixers, e.g. systems having mixing nozzles, agitator bead mills, colloid mills, cone mills and other homogenizers. In general, the sequence in which the individual components are combined is not critical. It may be advantageous to carry step i.a) out by firstly mixing the aqueous solvent and at least a part of the surfactant, e.g. the surfactant of group A and optionally the surfactant B, until a homogenous mixture is obtained, and then adding the solid saflufenacil with shear to said homogenous mixture. The mixture obtained from step i.a), i.e. a coarse suspension of saflufenacil in the aqueous solvent, is then subjected in step i.b) to suitable means for reducing the particle size of the saflufenacil particles present in the mixture typically to below 40 µm, preferably to below 30 µm and in particular to below 20 µm ($d_{90}$-value), e.g. to a particle size ($d_{90}$) in the range from 0.5 to 15 µm. Step i.b) may be carried out by any physical attrition method, such as grinding, crushing or milling, in particular by wet grinding or wet milling, including e.g. bead milling, hammer milling, jet milling, air classifying milling, pin milling, cryogenic grinding processes and the like. Steps i.a) and i.b) are usually performed subsequently. However it is also possible to perform these steps together.

In another embodiment of the invention, step i) comprises providing saflufenacil in the form of a powder, wherein the $d_{90}$ value of the powder particles is below 40 µm and in particular at most 30 µm or at most 20 µm, e.g. the particle size ($d_{90}$) is in the range from 1 to <40 µm, in particular 1 to 30 µm or 1 to 20 µm. The powder is usually prepared by comminuting the solid saflufenacil, e.g. the anhydrate or the crystalline hydrate, by a conventional dry milling technique, such as air milling, to a powder having the desired particle size. The thus obtained powder is then be suspended in the aqueous solvent or in an aqueous solution of the surfactant of group A and optionally the surfactant B.

It may be beneficial to add the polymeric surfactant A to the suspension of the saflufenacil provided in step i) before starting or initiating or effecting the polycondensation, in particular before adding the aminoplast pre-condensate thereto. In particular, it may be beneficial to keep the aqueous suspension of saflufenacil, which contains the polymeric surfactant A, for some time, e.g. for 10 to 180 minutes, before starting the polycondensation. It may be beneficial to add the polymeric surfactant A to the suspension after having performed step i).

In step ii), an aminoplast pre-condensate is added to the aqueous suspension of step i), which, upon curing in step iii), forms the solid, water-insoluble aminoplast polymer, which embeds or surrounds the solid saflufenacil particles, because the polycondensation preferentially occurs on the surface of the solid saflufenacil particles. The amount of aminoplast pre-condensate added in step ii) is chosen such that the desired amount of aminoplast polymer in the final microparticle composition is achieved. In fact, the amount added corresponds to the amount of aminoplast resin in the microparticles, taking into account that the mass is reduced by the amount of water which is formed during the polycondensation, and is usually in the range 0.5 to 40% by weight, in particular from 1 to 35% by weight and especially from 5 to 25% by weight, based on saflufenacil and calculated as organic matter.

Suitable pre-condensates, which can be added in step ii) include pre-condensates of melamine and formaldehyde, including wholly or partially etherified melamine-formaldehyde pre-condensates, urea-formaldehyde pre-condensates, thiourea-formaldehyde pre-condensates, pre-condensates of melamine, urea and formaldehyde (MUF resins), including mixtures of wholly or partially etherified melamine-formaldehyde pre-condensates and urea-formaldehyde pre-condensates, pre-condensates of urea and glutaraldehyde, pre-condensates of benzoguanamine and formaldehyde, mixtures of dicyandiamide and formaldehyde and urea-glyoxal polycondensates. Suitable aminoplast pre-condensates for microencapsulation are known and can be found, inter alia, in Kirk-Othmer, Encyclopedia of Chemical Technology, 3rd edition, Vol. 2, pp. 440-469, the prior art cited in the introductory part, U.S. Pat. No. 4,918,317, EP 26914, EP 218887, EP 319337, EP 383,337, EP 415273, DE 19833347, DE 19835114 and WO 01/51197. Suitable pre-condensates are commercially available, e. g. Cymel types, such as but not limited to Cymel® 303, 327, 328 or 385 (etherified melamine formaldehyde resins of Cytec), Maprenal® types, such as but not limited to Maprenal® MF 900w/95, MF 915/751B, MF 920/75WA, MF 921w/85WA, (etherified melamine formaldehyde resins of Ineos), Kauramin® types of BASF SE, such as but not limited to Kauramin® 783, Kauramin® 792 or Kauramin® 753 (melamine formaldehyde resins), Kauramin® 620 or Kauramin® 621 (melamine urea formaldehyde resins), Kaurit® types of BASF SE, such as but not limited to Kaurit® 210, 216, 217 or 220 (urea formaldehyde resins), Luracoll® types such as Luracoll® SD (etherified melamine formaldehyde resins), Luwipal® types such as but not limited to Luwipal® 063, Luwipal® 069 (etherified melamine formaldehyde resins), or Plastopal® types such as but not limited to Plastopal® BTM, Plastopal® BTW (etherified urea formaldehyde resins).

In suitable urea-formaldehyde or thiourea-formaldehyde pre-condensates, the molar ratios of urea or thiourea to formaldehyde are generally in the range from 1:0.8 to 1:4, in particular from 1:1.5 to 1:4, especially from 1:2 to 1:3.5.

In suitable melamine-formaldehyde or melamine-(thio) urea-formaldehyde pre-condensates, the molar ratios of melamine to formaldehyde are generally in the range from 1:1.5 to 1:10, in particular from 1:3 to 1:8 preferably 1:4 to 1:6.

In suitable melamine-formaldehyde or melamine-(thio) urea-formaldehyde pre-condensates, the molar ratios of melamine+urea or thiourea to formaldehyde are generally in the range from 1:0.8 to 1:9, in particular from 1:2 to 1:8 preferably 1:3 to 1:6. The molar ratio of urea or thiourea to melamine is usually in the range from 5:1 to 1:50 and in particular from 30:1 to 1:30.

The pre-condensates may be used in the form of etherified pre-condensates of amino compound and aldehyde. In these etherified pre-condensates the methylol groups formed by the reaction of the amino groups with formaldehyde with an alkanol or an alkandiol, in particular with a $C_1$-$C_4$-alkanol, such as methanol, ethanol, n-propanol or n-butanol, in particular methanol, or a $C_2$-$C_4$-alkandiol, such as ethylene glycol. The degree of etherification of these resins can be adjusted by the molar ratio of amino groups to alkanol which is typically in the range from 10:1 to 1:10, preferably in the range from 2:1 to 1:5.

The pre-condensates are most preferably selected from the group consisting of melamine-formaldehyde resins, including wholly or partially etherified melamine-formaldehyde pre-condensates, and urea-formaldehyde pre-condensates and mixtures thereof. Especially, the pre-condensate is a wholly or partially etherified melamine-formaldehyde condensate, which may contain small amounts, e.g. 1 to 20 mol. %, based on melamine, of urea.

Addition of the pre-condensate to the aqueous suspension is normally achieved by adding the pre-condensate in the form of an aqueous or alcoholic solution of the pre-condensate to the aqueous suspension or by mixing suitable amounts of the dissolved pre-condensate. Preferably, suitable mixing devices, such as stirrers or inline-mixers are used in order to achieve a uniform distribution of the pre-condensate in the aqueous suspension. It may be beneficial to add the pre-condensate, preferably in the form of a solution, to the aqueous suspension of saflufenacil with stirring. Preferably, the addition of the pre-condensate is performed under conditions, where the polycondensation reaction is slow or does not occur, e.g. where either the pH of the aqueous suspension at least pH 6, e.g. in the range form pH 6 to pH 10, or where the temperature does not exceed 30° C. or both.

The polycondensation of the aminoplast pre-condensate can be effected or initiated in a well-known manner, e.g. by heating the aqueous suspension to a certain reaction temperature, at a pH, where the polycondensation at the reaction temperature occurs. During the polycondensation, the aminoplast pre-condensate is converted into a water-insoluble aminoplast resin, which precipitates from the aqueous phase and deposits preferably on the surface of the solid saflufenacil particles, thereby embedding or surrounding the solid saflufenacil particles. Thereby, it is possible to a achieve an efficient encapsulation even with small amounts of the aminoplast pre-condensate.

Preferably, the polycondensation of the aminoplast is performed at pH of less than pH 6, in particular at a pH of at most pH 5, e.g. in the range of pH 0 to 6, more particularly in the range from pH 1 to 5 or in the range from pH 2 to 4.

The pH of the aqueous suspension is usually adjusted by addition of suitable amounts of an organic or inorganic acid, such as sulfuric acid, hydrochloric acid, phosphoric acid, a carboxylic acid including alkanoic acids, alkandioic acids or hydroxycarboxylic acids, such as formic acid, acetic acid, propionic acid, oxalic acid, malic acid or citric acid, and alkyl or arylsulfonic acids, such as methanesulfonic acid or toluenesulfonic acid. It is preferred, if at least a portion, in particular the majority of the acid is present in the aqueous suspension, before the aqueous suspension is heated to the reaction temperature.

Preferably, the polycondensation of the aminoplast pre-condensate is performed at elevated temperature, in particular at a temperature of at least 30° C., in particular at least 40° C. or at least 50° C., e.g. at a temperature in the range of 30 to 100° C., in particular in the range of 40 to 95° C. or in the range of 50 to 90° C. It may be possible to effect the start of the polycondensation of the aminoplast at a comparatively low temperature, e.g. a temperature in the range of 30 to 65° C. or 35 to 60° C. and then complete the polycondensation reaction at a higher temperature of e.g. 50 to 100° C. or 60 to 90° C. The time for completing the polycondensation may vary, depending on the reactivity of the pre-condensate, the temperature and the pH of the aqueous suspension and may take from 1 h to 24 h, in particular from 2 to 12 h. Preferably, the polycondensation reaction is at least partly performed at temperatures of at least 50° C., in particular at least 60° C., e.g. for 1 to 8 h at a temperature in the range from 50 to 100° C., in particular 60 to 90° C.

The thus obtained aqueous suspension of the saflufenacil microparticles may be neutralized by the addition of a base. Preferably, the pH of the suspension is adjusted to a pH of at least 6, e.g. a pH in the range of pH 6 to 10, in particular in the range of pH 6.5 to 9.0.

From the thus obtained aqueous suspension the microparticles can be isolated, e.g. by filtration or centrifugation, or the aqueous suspension may be spray-dried, granulated or freeze-dried, to obtain a solid composition in the form of a powder or granules. The solid composition may be re-dispersed or formulated by using formulation auxiliaries as described above.

The aqueous suspension may also be used as such or formulated as a liquid formulation, e.g. as a suspension, by using suitable formulation auxiliaries as described above, e.g. such as thickeners, anionic surfactants B, non-ionic surfactants and/or biocides.

The invention also relates to uses of the microparticle composition of the invention for protecting crop plants and to methods of controlling undesired vegetation, which comprise applying the formulations, in diluted or undiluted form, to plants, their environment and/or seeds.

The compositions of the invention provide for a very good control of vegetation in non-crop areas, especially at high application rates. However, generally no higher application rates are required in comparison with conventional formulations of non-encapsulated saflufenacil for achieving similar control.

In crops such as soybean, cotton, oilseed rape, flax, lentils, rice, sugar beet, sunflower, tobacco and cereals, such as, for example maize or wheat, the compositions of the invention are active against broad-leaved weeds and grass weeds and provide for less damage to the crop plants in comparison with conventional formulations of non-encapsulated saflufenacil. This effect is particularly observed at low application rates.

Furthermore, the compositions of the invention provide for long lasting residual activity, which exceeds the residual activity of conventional formulations of non-encapsulated saflufenacil.

Depending on the application method in question, the formulations of the invention can additionally be employed in a further number of crop plants to remove undesired plants. Crops which are suitable are, for example, the following:

*Allium cepa, Ananas comosus, Arachis hypogaea, Asparagus officinalis, Beta vulgaris* spec. *altissima, Beta vulgaris* spec. *rapa, Brassica napus* var. *napus, Brassica napus* var. *napobrassica, Brassica rapa* var. *silvestris, Camellia sinensis, Carthamus tinctorius, Carya illinoinensis, Citrus limon, Citrus sinensis, Coffea arabica* (*Coffea canephora, Coffea liberica*), *Cucumis sativus, Cynodon dactylon, Daucus carota, Elaeis guineensis, Fragaria vesca, Glycine max, Gossypium hirsutum,* (*Gossypium arboreum, Gossypium herbaceum, Gossypium vitifolium*), *Helianthus annuus, Hevea brasiliensis, Hordeum vulgare, Humulus lupulus, Ipomoea batatas, Juglans regia, Lens culinaris, Linum usitatissimum, Lycopersicon lycopersicum, Malus* spec., *Manihot esculenta, Medicago sativa, Musa* spec., *Nicotiana tabacum* (*N. rustica*), *Olea europaea, Oryza sativa, Phaseolus lunatus, Phaseolus vulgaris, Picea abies, Pinus* spec., *Pisum sativum, Prunus armeniaca, Prunus avium, Prunus cerasus, Prunus dulcis, Prunus domesticua, Prunus persica, Pyrus communis, Ribes sylvestre, Ricinus communis, Saccharum officinarum, Secale cereale, Solanum tuberosum, Sorghum bicolor* (*S. vulgare*), *Theobroma cacao, Trifolium pratense, Triticum aestivum, Triticum durum, Vicia faba, Vitis vinifera* and *Zea mays.*

In addition, the formulations of the invention can also be used in crops which tolerate the effect of herbicides as the result of breeding, including genetic engineering methods.

Furthermore, the compositions of the invention can also be used in crops which tolerate attack by insects or fungi as the result of breeding, including genetic engineering methods.

Moreover, it has been found that the compositions of the invention are also suitable for the defoliation and desiccation of plant parts, for which crops plants such as cotton, potato, oilseed rape, sunflower, soybean or field beans, in particular cotton, are suitable.

As desiccants, the compositions of the invention are particularly suitable for desiccating the aerial parts of crop plants such as potato, oilseed rape, sunflower and soybean. This makes possible the fully mechanical harvesting of these important crop plants. Also of economic interest is to facilitate harvesting, which is made possible by concentrating within a certain period of time the dehiscence, or reduction of adhesion to the tree, in citrus fruit, olives or other species and varieties of pome fruit, stone fruit and nuts. The same mechanism, i.e. the promotion of the development of abscission tissue between fruit part or leaf part and shoot part of the plants is also essential for the controlled defoliation of useful plants, in particular cotton. Moreover, a shortening of the time interval within which the individual cotton plants mature leads to an increased fiber quality after harvesting.

Moreover, it has been found that the compositions of the invention are also suitable for the control of conifers, in particular of conifer seedlings which grow naturally, and specifically for the control of pine seedlings which grow naturally.

In general, the compositions of the invention as described herein are useful for combating undesired vegetation. For this purpose, the compositions may be applied as such or are preferably applied after dilution with water. Preferably, for various purposes of end user application, a so-called aqueous spray-liquor is prepared by diluting the compositions of the present invention with water, e.g. tap water. The spray-liquors may also comprise further constituents in dissolved, emulsified or suspended form, for example fertilizers, active substances of other groups of herbicidal or growth-regulatory active substances, further active substances, for example active substances for controlling animal pests or phytopathogenic fungi or bacteria, furthermore mineral salts which are employed for alleviating nutritional and trace element deficiencies, and non-phytotoxic oils or oil concentrates. As a rule, these constituents are added to the spray mixture before, during or after dilution of the compositions according to the invention.

The compositions of the invention can be applied by the pre-emergence or the post-emergence method. If the saflufenacil is less well tolerated by certain crop plants, application techniques may be employed where the herbicidal compositions are sprayed, with the aid of the spraying apparatus, in such a way that the leaves of the sensitive crop plants ideally do not come into contact with them, while the active substances reach the leaves of undesired plants which grow underneath, or the bare soil surface (post-directed, lay-by).

Depending on the aim of the control measures, the season, the target plants and the growth stage, the compositions of the invention are applied to such a degree that the application rates of saflufenacil are from 0.001 to 3.0, preferably from 0.01 to 1.0 kg/ha active substance (a.s.).

To widen the spectrum of action and to obtain synergistic effects, the compositions of the invention can be mixed with a large number of representatives of other groups of herbicidal or growth-regulatory active substances and applied together with these.

Examples of suitable mixing partners are 1,2,4-thiadiazoles, 1,3,4-thiadiazoles, amides, aminophosphoric acid and its derivatives, aminotriazoles, anilides, aryloxy/heteroaryloxyalkanoic acids and their derivatives, benzoic acid and its derivatives, benzothia-diazinones, 2-(hetaroyl/aroyl)-1,3-cyclohexanediones, heteroaryl aryl ketones, benzylisoxazolidinones, meta-$CF_3$-phenyl derivatives, carbamates, quinolinecarboxylic acid and its derivatives, chloroacetanilides, cyclohexenone oxime ether derivatives, diazines, dichloropropionic acid and its derivatives, dihydrobenzofurans, dihydrofuran-3-ones, dinitroanilines, dinitrophenols, diphenyl ethers, dipyridyls, halocarboxylic acids and their derivatives, ureas, 3-phenyluracils, imidazoles, imidazolinones, N-phenyl-3,4,5,6-tetrahydrophthalimides, oxadiazoles, oxiranes, phenols, aryloxy- and hetero-aryloxyphenoxypropionic acid esters, phenylacetic acid and its derivatives, 2-phenyl-propionic acid and its derivatives, pyrazoles, phenylpyrazoles, pyridazines, pyridine-carboxylic acid and its derivatives, pyrimidyl ethers, sulfonamides, sulfonylureas, triazines, triazinones, triazolinones, triazolecarboxamides and uracils.

It is of also possible to use the compositions of the present invention as a tank-mix partner with other formulations. Thus, the compositions of the invention can be mixed and applied together with a large number of different pesticide compound formulations, for example those that include active ingredients or adjuvants, such as atrazine, glyphosate, glufosinate, S-metolachlor, 2,4-D ester, isoxaflutole, diflufenzopyr, dicamba, mesotrione, dimethenamid-P, pendimethalin, imazethapyr, paraffin oils, polyol fatty acid esters, polyethoxylated polyol fatty acid esters, ethoxylated alkyl aryl phosphates, methylated seed oils, emulsifiers, ammonium sulfate or mixtures thereof.

Moreover, it may be useful to apply the saflufenacil-containing compositions of the invention, separately or in combination with other herbicides, jointly as a mixture with yet further plant protection agents, for example with agents for controlling pests or phytopathogenic fungi or bacteria. Also of interest is the miscibility with mineral salt solutions which are employed for alleviating nutritional and trace element deficiencies. Nonphytotoxic oils and oil concentrates may also be added.

The following examples are intended to further illustrate the present invention without limiting its scope in any way.

I. ANALYTICS

Particle size Distribution (PSD) was determined by statistic laser scattering using a Malvern Mastersizer 200 according to European norm ISO 13320 EN. The data were treated according to the Mie-Theory by software using a "universal model" provided by Malvern Instruments. Important parameters are the $d_n$-values for n=10, 50 and 90, the $d_{10}$, $d_{50}$ and $d_{90}$.

Solid content of the final dispersion was measured by evaporating the volatiles of small probe of the aqueous suspension in an oven at 105° C. for 2 hours. The value indicated for the examples is an average value from three parallel experiments.

II. INGREDIENTS

Surfactant 1: 20% aqueous solution of poly(2-acrylamido-2-methylpropane sulfonic acid) sodium salt with pH 2.5-4;

Surfactant 2: 15% aqueous solution of sodium dodecyl sulfate

Surfactant 3: Naphthalenesulfonic acid formaldehyde condensate Sodium salt

Pre-condensate P1: 70% w/w aqueous solution of etherified melamine formaldehyde pre-condensate (Luracoll® SD of BASF SE);

Thickener: Viscalex HV 30® (30% aqueous solution of an acrylic polymer; BASF SE)

Saflufenacil: Anyhdrate, purity 98.8%

III. PREPARATION OF THE COMPOSITIONS OF THE INVENTION

Example 1

95.56 g of water, 2.97 g of surfactant 2, 40.05 g of Saflufenacil, which had been previously air-milled to a particle size ($d_{90}$) of about 3 μm, 9.09 g of pre-condensate P1 and 4.01 g of a 10% w/w aqueous formic acid where charged into a 250 ml reaction vessel, equipped with a stirrer having anchor stirring blade. The reaction vessel was heated to 30° C. and the mixture was stirred for 40 minutes at 30° C. with 700 rpm. Then, surfactant 1 was added and the mixture was stirred at 30° C. for further 90 minutes with 350 rpm. Then the reaction vessel was slowly heated within 1 h to 80° C. and the temperature was kept at 80° C. for further 2 h. Then the reactor was cooled to 22° C. and the pH of the obtained suspension was adjusted to pH 7 by adding triethanol amine. Then, 5.2 g of the aqueous thickener was added with stirring.

The resulting aqueous suspension had a solid content of 28.9%. The particle size distribution is given in table 1.

Example 2

307.5 g of water, 18.7 g of surfactant 2, 112.0 g of Saflufenacil, which had been previously air-milled to a particle size ($d_{90}$) of about 3 μm, 57.2 g of pre-condensate P1 and 56.0 g of a surfactant 1 where charged into a 2 L reaction vessel, equipped with a stirrer having anchor stirring blade. The reaction vessel was heated to 30° C. and the mixture was stirred for 40 minutes at 30° C. with 300 rpm. Then, 6.3 g of 10% w/w aqueous formic acid was added and the mixture was stirred at 30° C. for further 60 minutes with 250 rpm. Then the reaction vessel was slowly heated within 1 h to 80° C. and the temperature was kept at 80° C. for further 2 h. Then the reactor was cooled to 22° C.

The resulting aqueous suspension had a solid content of 25.9%. The particle size distribution is given in table 1.

Example 3

105.63 g of water, 2.97 g of surfactant 2, 40.05 g of Saflufenacil, which had been previously air-milled to a particle size ($d_{90}$) of about 3 μm, 9.09 g of pre-condensate P1 and 4.01 g of a 10% w/w aqueous formic acid where charged into a 250 ml reaction vessel, equipped with a stirrer having anchor stirring blade. The reaction vessel was heated to 30° C. and the mixture was stirred for 40 minutes at 30° C. with 700 rpm. Then, surfactant 3 was added and the mixture was stirred at 30° C. for further 90 minutes with 350 rpm. Then the reaction vessel was slowly heated within 1 h to 80° C. and the temperature was kept at 80° C. for further 2 h. Then the reactor was cooled to 22° C. and during cooling a solution of 3.45 g of sodium bisulfite in 9.55 g of water was added.

Then the pH of the obtained suspension was adjusted to pH 7 by adding triethanol amine. Then, 5.2 g of the aqueous thickener was added with stirring.

The resulting aqueous suspension had a solid content of 29.9%. The particle size distribution is given in table 1.

TABLE 1

| | Particle size distribution (μm) | | |
|---|---|---|---|
| | $d_{10}$ | $d_{50}$ | $d_{90}$ |
| Example 1 | 2.335 | 3.485 | 6.119 |
| Example 2 | 3.525 | 7.183 | 38.318 |
| Example 3 | 2.067 | 3.096 | 4.801 |

Examples 4-6

The microparticles of examples 4 to 6 were prepared by using the following protocol: Water, Saflufenacil, which had been previously air-milled to a particle size ($d_{90}$) of about 3 μm, pre-condensate P1 and 4.01 g of a 10% w/w aqueous formic acid where charged into a 250 ml reaction vessel, equipped with a stirrer having anchor stirring blade. The reaction vessel was heated to 30° C. and the mixture was stirred for 40 minutes at 30° C. with 700 rpm. Then, surfactant 1 was added and the mixture was stirred at 30° C. for further 90 minutes with 350 rpm. Then the reaction vessel was slowly heated within 1 h to 80° C. and the temperature was kept at 80° C. for further 2 h. Then the reactor was cooled to 22° C. and the pH of the obtained suspension was adjusted to pH 7 by adding triethanol amine.

TABLE 2

|  | Ingredient | Example 4 | Example 5 | Example 6 |
|---|---|---|---|---|
| Charge | Water | 84.06 g | 95.56 g | 107.68 g |
|  | Saflufenacil | 40.05 g | 40.05 g | 40.05 g |
|  | Surfactant 2 | 2.97 g | 2.97 g | 2.97 g |
|  | Precondensate P1 | 0.46 g | 9.09 g | 18.16 g |
|  | Formic acid (10%) | 4.01 g | 4.01 g | 4.01 g |
| Feed 1 | Surfactant 1 | 14.46 g | 14.46 g | 14.46 g |

TABLE 3

Analytical assessment of examples 4-7

| | Particle size distribution (μm) | | |
|---|---|---|---|
| Example | d(0.1) | d(0.5) | d(0.9) |
| 4 | 3.052 | 5.869 | 11.053 |
| 5 | 2.575 | 4.031 | 6.478 |
| 6 | 3.205 | 5.395 | 102.869 |

For examples 5 and 6, the amount of free pesticide (non-encapsulated and released) was determined as followed: First, a 10 w % solution of poloxamer 335 (Pluronic® PE 10500) was prepared which was adjusted to pH 5 with acetic acid. This solution acted as a receiver solution for non- or not well encapsulated pesticide. To 250 ml of the receiver solution was added 125 mg of the microparticle dispersion and stirred over 10 days. After 1 d, 4 d and 7 d samples were taken and drawn through a 0.2 μm Teflon filter to remove intact microparticles. In the filtrate, the amount of pesticide was determined by reverse phase HPLC and normalized in way that the entire amount of pesticide would account for 100% (100% "free herbicide", this is found, e.g., if no encapsulation would have taken place at all). The results are summarized in table 4:

TABLE 4

Release of saflufenacil from microparticles

|  |  | Example 5 10% Polymer | Example 6 20% Polymer |
|---|---|---|---|
| A.I. released in [%] | 1 day | 22 | 11 |
|  | 4 days | 54 | 15 |
|  | 7 days | 73 | 16 |

IV. FORMULATION EXAMPLES

General Procedure:

The aqueous microparticle suspensions of the present invention are mixed with water and additives while stirring at room temperature. Thus, an aqueous CS agrochemical formulation was prepared by mixing an aqueous suspension of microparticles of the invention with an anionic surfactant, a non-ionic surfactant, antifoam, preservative, propylene glycole as antifreeze agent, thickener in such amounts that the final concentration is as follows:

15-25 wt % saflufenacil in the form of microparticles;
0.2-1 wt % anionic surfactant, e.g. naphthalenesulfonic acid formaldehyde condensate sodium salt or phenolsulfonic acid urea formaldehyde condensate;
1-6 wt % non-ionic alkylalkoxylated surfactants, e.g. a non-ionic block copolymer of ethyleneoxide and propyleneoxide, such as Pluronic® PE 10500;
0.1-0.05 wt % antifoam, e.g. a silicon defoamer, such as Wacker Silicon® SRE-PFL;
0.2-5 wt % polymeric dispersant;
0.2 wt % preservatives, such as Acticide® MBS;
0.5-0.7 wt % propylene glycol antifreeze;
0.1-0.3 wt % thickener, such as xanthan gum, e.g. Rhodopol® G;
and water up to 100 w %.

Example 7

CS-Formulation 622 g of the capsule suspension from example 5 were mixed at 22° C. with 70 g propylene glycol, 30 g of a triblockcopolymer of ethyleneoxide/propyleneoxide, 20 g phenolsulfonic acid urea formaldehyde condensate, 5 g silicon defoamer, 2 g preservative, 3 g xanthan gum and water up to 1 liter.

Storage stability of formulation at different temperatures was studied. No agglomeration or crystallization of saflufenacil was observed (see Table 5)

TABLE 5

Formulation storage stability (Particle Size Distribution)

| Temperature | initial | | 2 weeks | | 4 weeks | |
|---|---|---|---|---|---|---|
| [° C.] | d50 [μ] | d90 [μ] | d50 [μ] | d90 [μ] | d50 [μ] | d90 [μ] |
| +20 | 2.2 | 6.1 | 2.7 | 6.1 | 2.7 | 6.2 |
| +40 |  |  | 2.7 | 6.1 | 2.6 | 6.2 |
| +54 |  |  | 2.7 | 5.8 |  |  |
| +/−10* |  |  | 2.6 | 5.8 | 2.7 | 6.0 |

*cycling temperatures from −10° C. to +10° C. with cycle interval of 12 h

V. HERBICIDAL ACTIVITY

The biological activity of the aqueous microparticle suspensions was tested by using the following release bioassay:

The culture containers used were plastic flowerpot trays (5×7 pots per tray) containing loamy sand with approximately 3.0% OM as substrate. Each pot was filled with the substrate. Then the microparticle suspensions, which were diluted with water, were applied by drip application (2 ml of volume). The concentration of the dilution was chosen in a manner that defined use rates of 6.25-200 g/ha (6 rates) were applied. One pot was only treated with water. As reference a non-encapsulated formulation of the same active ingredient was used. In total up to 4 trays were treated in the same way, each tray representing 1 time point. After application all trays, except the first one (t=0), were sealed in plastic bags and stored at 25° C. for a specific time.

For testing the release of the different microparticle samples, time points up to 6 weeks were tested. For each time point one tray was taken out of the storage and seeds of the test plants (cress as bioindicator plant) were sown on the surface of each individual pot. The tray was irrigated gently to promote germination and growth and subsequently covered with transparent plastic hoods until the plants had rooted. This cover caused uniform germination of the test plants, unless this has been impaired by the active ingredient sample.

The plants were kept in the glasshouse, the growing time until assessment of the growth was approx. 10-12 days. During this time, the plants were tended, and their response to the individual treatments was evaluated. Evaluation was carried out using a scale from 0 to 100. 100 means no emergence of the plants, or complete destruction of at least the aerial moieties, and 0 means no damage, or normal course of growth. A good herbicidal activity is given at values of at least 70 and a very good herbicidal activity is given at values of at least 85. For evaluating the release profile the efficacy of the active ingredient samples at different time intervals after application (up to 6 weeks) were compared, a release curve (loss of activity with increased time) was reported and put into relation to the non-encapsulated reference. The results are summarized in table 6.

TABLE 6

| | | Reference A.I. Crystals (0% Polymer) | Example 6 20% Polymer |
|---|---|---|---|
| Biological activity in greenhouse test [%] Bioassay | 0 days 42 days | 83 75 | 75 85 |

We claim:

1. A microparticle composition comprising saflufenacil, wherein saflufenacil is present in the form of microparticles, which comprise solid saflufenacil, which is surrounded or embedded by an aminoplast polymer, which is a polycondensation product of one or more amino compounds and one or more aldehydes, wherein the aminoplast polymer is selected from the group consisting of melamine formaldehyde resins and urea formaldehyde resins, and wherein the amount of aminoplast polymer in the microparticle composition is from 0.5 to 40% by weight, based on the total weight of aminoplast polymer and saflufenacil, and wherein the microparticle composition comprises at least one anionic polymeric surfactant A having a plurality of sulfate or sulfonate groups selected from the group consisting of
a lignin based sulfonic acid;
an arylsulfonic acid formaldehyde condensate and an arylsulfonic acid formaldehyde urea condensate; and
a homo- or copolymer of monomer M1 selected from a (meth)acrylate monomer having a sulfonic acid group and a (meth)acrylamide monomer having a sulfonic acid group, optionally with one or more comonomer M2 different from monomer M1.

2. The composition of claim 1, wherein the microparticles have a weight average particle diameter $d_{50}$ in the range from 1 to 25 μm, as determined by dynamic light scattering of an aqueous dispersion of the microcapsules.

3. The composition of claim 1, wherein the microparticles comprise less than 10% by weight of particles having a particle diameter of more than 50 μm, as determined by dynamic light scattering of an aqueous dispersion of the microcapsules.

4. The composition of claim 1, wherein the polymeric surfactant A is a homo- or copolymer of a monomer M1 which is a (meth)acrylate monomer having a sulfonic acid group or a (meth)acrylamide monomer having a sulfonic acid group optionally with one or more comonomer M2.

5. The composition of claim 4, wherein the monomer M1 is 2-acrylamido-2-methylpropane sulfonic acid.

6. The composition of claim 4, wherein the composition contains a further polymeric surfactant A selected from lignin based sulfonic acids.

7. The composition of claim 6, wherein the lignin based sulfonic acid is selected from the group consisting of a lignosulfonic acid and ethoxylated lignosulfonic acid.

8. The composition of claim 1, further comprising at least one anionic emulsifier in addition to the polymeric surfactant A.

9. The composition of claim 1, which is an aqueous suspension of the microparticles.

10. The composition of claim 1, which is solid composition of the microparticles.

11. The composition of claim 1, comprising one or more auxiliaries conventionally employed for the formulation of plant protection compositions.

12. A method for producing the composition of claim 1, which comprises the following steps:
    i) providing an aqueous suspension or dispersion of solid saflufenacil particles;
    ii) adding an aminoplast pre-condensate to the aqueous suspension; and
    iii) effecting the polycondensation of the aminoplast pre-condensate in the presence of at least one anionic polymeric surfactant A having a plurality of sulfate or sulfonate groups,
    wherein the aminoplast polymer is selected from the group consisting of melamine formaldehyde resins and urea formaldehyde resins, and wherein the amount of aminoplast polymer in the microparticle composition is from 0.5 to 40% by weight, based on the total weight of aminoplast polymer and saflufenacil,
    and wherein the at least one anionic polymeric surfactant A is selected from the group consisting of:
    a lignin based sulfonic acid;
    an arylsulfonic acid formaldehyde condensate and an arylsulfonic acid formaldehyde urea condensate; and
    a homo- or copolymers of monomer M1 selected from a (meth)acrylate monomer having a sulfonic acid group and a (meth)acrylamide monomer having a sulfonic acid group, optionally with one or more comonomer M2 different from monomer M1.

13. The method of claim 12, wherein the saflufenacil particles in the aqueous suspension dispersion have a weight average particle diameter $d_{50}$ in the range from 0.5 to 25 μm, as determined by dynamic light scattering.

14. The method of claim 12, wherein the amount of aminoplast pre-condensate added in step ii) is in the range 0.5 to 40% by weight, based on the total amount of saflufenacil and aminoplast pre-condensate and calculated as solid organic matter.

15. The method of claim 12, wherein the at least one anionic polymeric surfactant A having a plurality of sulfate or sulfonate groups is a homo- or copolymer of a monomer M1 which is a (meth)acrylate monomer having a sulfonic acid group or (meth)acrylamide monomer having a sulfonic acid group, optionally with one or more comonomer M2.

16. The method of claim 15, wherein the monomer M1 is 2-acrylamido-2-methylpropane sulfonic acid.

17. The method of claim 15, wherein an additional polymeric surfactant A is used, which is a lignin based sulfonic acid.

18. The method of claim 17, wherein the lignin based sulfonic acid is selected from the group consisting of a lignosulfonic acid and ethoxylated lignosulfonic acid.

19. The method of claim 12, wherein the at least one anionic polymeric surfactant A having a plurality of sulfate or sulfonate groups is added prior to the addition of the aminoplast pre-condensate in step ii).

20. The method of claim 12, wherein the optional one or more comonomer M2 is selected from the group consisting of styrene, $C_1$-$C_4$-alkylacrylates, $C_1$-$C_4$-alkylmethacrylates, acrylamide, methacrylamide, acrylic acid, methacrylic acid, $C_1$-$C_4$-alkylacrylates, and $C_1$-$C_4$-alkylmethacrylates.

21. The method of claim 12, wherein the lignin based sulfonic acid is selected from the group consisting of a lignosulfonic acid and ethoxylated lignosulfonic acid.

22. A method of controlling undesired vegetation, wherein the microparticle composition of claim 1 is allowed to act on plants, their environment and/or on seeds.

23. The composition of claim 1, wherein the optional one or more comonomer M2 is selected from the group consisting of styrene, $C_1$-$C_4$-alkylacrylates, $C_1$-$C_4$-alkylmethacrylates, acrylamide, methacrylamide, acrylic acid, methacrylic acid, $C_1$-$C_4$-alkylacrylates, and $C_1$-$C_4$-alkylmethacrylates.

24. The composition of claim 1, wherein the lignin based sulfonic acid is selected from the group consisting of a lignosulfonic acid and ethoxylated lignosulfonic acid.

\* \* \* \* \*